United States Patent [19]

Ogoe et al.

[11] Patent Number: 4,927,870

[45] Date of Patent: May 22, 1990

[54] IGNITION RESISTANT MODIFIED THERMOPLASTIC COMPOSITION

[75] Inventors: Samuel A. Ogoe, Angleton; Thoi H. Ho, Lake Jackson, both of Tex.

[73] Assignee: The Dow Chemical Company, Midland, Mich.

[21] Appl. No.: 236,706

[22] Filed: Aug. 25, 1988

[51] Int. Cl.$^5$ .............................. C08K 5/52; C08K 3/24

[52] U.S. Cl. ................................. 524/140; 524/141; 524/143; 524/423; 524/537

[58] Field of Search ............... 524/141, 423, 537, 140, 524/143

[56] References Cited

U.S. PATENT DOCUMENTS

| | | | |
|---|---|---|---|
| 3,671,487 | 6/1972 | Abollos | 260/40 |
| 3,773,715 | 11/1973 | Largman et al. | |
| 4,248,976 | 2/1981 | Clubley et al. | 525/2 |
| 4,268,429 | 5/1981 | Webb et al. | 524/423 |
| 4,332,714 | 6/1982 | Haaf et al. | 524/141 |
| 4,339,556 | 7/1982 | Baer | 523/220 |
| 4,355,126 | 10/1982 | Haaf et al. | 524/411 |
| 4,463,130 | 7/1984 | Serini et al. | 525/67 |
| 4,532,281 | 7/1985 | Lee et al. | 524/141 |
| 4,532,284 | 7/1985 | Ogoe | 524/423 |
| 4,563,496 | 1/1986 | Lindner et al. | 524/430 |
| 4,576,991 | 3/1986 | Cooper | 525/146 |
| 4,649,168 | 3/1987 | Kress et al. | 524/130 |
| 4,672,086 | 6/1987 | Seiler et al. | 524/127 |
| 4,692,488 | 9/1987 | Kress et al. | 524/139 |
| 4,721,774 | 1/1988 | Todtemann et al. | 524/141 |
| 4,751,260 | 6/1988 | Kress et al. | 524/130 |
| 4,766,165 | 8/1988 | Kress et al. | 524/140 |

FOREIGN PATENT DOCUMENTS 0019127 11/1980 Fed. Rep. of Germany ...... 524/423

Primary Examiner—Lewis T. Jacobs
Attorney, Agent, or Firm—B. G. Colley

[57] ABSTRACT

Ignition resistant non-haloaromatic containing thermoplastic polymer compositions are disclosed which are mixtures of (1) a non-carbonate polymer such as a polyester terephthalate, a polyacetal, a polymethylmethacrylate and the like, (2) a carbonate polymer, or (3) a blend of (1) and (2) with a high elastic memory polytetrafluoroethylene, an organic phosphate, and a metal salt of an inorganic acid.

11 Claims, No Drawings

IGNITION RESISTANT MODIFIED THERMOPLASTIC COMPOSITION

BACKGROUND OF THE INVENTION

This invention relates to ignition resistant thermoplastic compositions made with thermoplastics such as styrene-butadiene-acrylonitrile copolymers, polyesters, polycarbonates, etc. and blends thereof containing polytetrafluoroethylene, metal salts of inorganic acids and organo phosphorous compounds which act to reduce the susceptibility of such compositions to ignition and/or burning or at least to minimize the dripping of molten polymer when exposed to fire conditions.

Thermoplastic polymers have found extensive commercial application because of their excellent physical properties. These thermoplastic polymers are suitable for the manufacture of molded parts wherein impact strength, rigidity, toughness, heat resistance, and excellent electrical properties are required.

However, these polymers exhibit a brief but definite burning time when contacted with an open flame.

In attempts to increase the combustion resistance of thermoplastic polymers, it has been a common practice to incorporate monomeric phosphites, phosphoric acid esters, thiophosphoric acid esters containing halogenated alkyl radicals and halogenated organic compounds into the carbonate polymer. However, in order to obtain any noticeable improvement in combustion resistance, these additives and/or combinations of the additives have been employed in such large quantities that they often adversely affect some of the desirable physical properties of the carbonate polymer such as heat stability, toughness, and ultra-violet light stability.

In U.S. Pat. No. 3,671,487 fire retardant polyester resins comprising glass fibers, fire retardant additives such as halogen-containing compounds or phosphate compounds and fibril forming polytetrafluoroethylene (PTFE) are disclosed and claimed. The present invention represents an improvement over this patent in that the need for glass fibers and halogenated compounds has been obviated.

U.S. Pat. No. 4,653,496 discloses the use of a combination of halogenated compound and metal oxides for ignition resistance of the blend of polycarbonate and acrylonitrile-butadiene-styrene copolymer (ABS). However, the metal oxides result in the thermal stability of PC.

U.S. Pat. No. 4,692,488 discloses a blend of a polycarbonate, a copolymer of styrene and acrylonitrile, triphenylphosphate, and tetrafluoropolyethylene. Comparison example 2 (line 53, page 8) of this patent indicates that without $Na_2SO_4$, the blend of PC and ABS with triphenylphosphate and polytetrafluoroethylene give only V-1 rating.

British patent 1,459,648 discloses the use of triphenylphosphate, a non-combustible fibre material and polytetrafluoroethylene as flame retardant additives for PC, polyesters, and ABS. However, the patent shows that polytetrafluoroethylene resin does not prevent dripping without the addition of fibre.

Aromatic carbonate polymers having good flame retardant properties are shown in U.S. Pat. No. 4,626,563. However, the present invention represents an improvement over this patent also in that the need for halogenated compounds has been eliminated. The elimination of halogenated compounds is important since the presence of these compounds adversely effects the ultra-violet light stability of the polymers.

SUMMARY OF THE INVENTION

The present invention is an ignition resistant non-haloaromatic thermoplastic polymer composition comprising
(A) a member of the group consisting of
  (i) a non-carbonate thermoplastic polymer or copolymer,
  (ii) a carbonate polymer, and
  (iii) a blend of (i) and (ii),
(B) 0.001 to 20% by weight of a high elastic memory polytetrafluoroethylene having a heat shrinkage equal to or greater than 15%,
(C) 0.1 to 30% by weight of an organic phosphate, and
(D) 0.001 to 10% by weight of a metal salt of an inorganic acid.

The first retardant carbonate polymer compositions of the present invention are suitably employed in most applications in which opaque modified polycarbonates have been previously utilized. Applications of particular interest for the utilization of the said carbonate polymer compositions of this invention are pigmented and/or colored carbonate polymers useful as: automobile parts, e.g., air filters, fan housings, exterior components, housings for electrical motors, appliances, business and office equipment, photographic equipment, and aircraft applications.

DETAILED DESCRIPTION OF THE INVENTION

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(4-hydroxyphenyl)-alkylidenes (often called bisphenol-A type diols), including their aromatically and aliphatically substituted derivatives such as disclosed in U.S. Pat. Nos. 2,999,835; 3,038,365, 3,334,154, and 4,299,928; and carbonate polymers derived from other aromatic diols such as described in U.S. Pat. No. 3,169,121.

It is understood, of course, that the carbonate polymer may be derived from (1) two or more different dihydric phenols or (2) one or more dihydric phenols and one or more hydroxy- or acid-terminated reactants such as dicarboxylic acids, or alkylene glycols in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known; for example, several suitable methods are disclosed in the aforementioned patents which are hereby incorporated by reference in their entirety.

The polyesters that can be employed in the present invention are selected from the group consisting of polymeric glycol terephthalate and isophthalate esters having repeating units of the general formula:

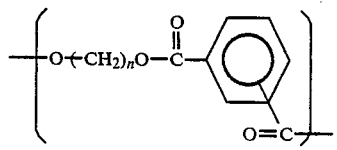

wherein n is a whole number of from 2 to 4, and mixtures of such esters. The preferred polyesters, for example, are poly(ethylene terephthalate), poly(1,4-butylene terephthalate), and copolyesters. Also included are the branched copolyesters of poly(1,4-butyl terephthalate) and poly(ethylene terephthalate). The following patents show the preparation of polyesters and are incorporated by reference, British 1,459,648 and U.S. Pat. No. 3,671,487.

Suitable polytetrafluoroethylene polymers for use in this invention are those adapted to form a fibril structure to stabilize the polymer under molten conditions. Such polymers are generally disclosed by U.S. Pat. Nos. 3,005,795, 3,671,487 and 4,463,130. The teachings of these patents are incorporated herein by reference. In addition, the polytetrafluoroethylene (PTFE) polymers must have a high elastic memory and/or have a heat shrinkage equal to or greater than 15% when tested under the following conditions.

Polycarbonate resin with 0.5% of PTFE was injection molded into bars having the dimensions of $5'' \times \frac{1}{2}'' \times 1/16''$ and heated at 160° C. for 1 hour. The shrinkage was measured and compared to the length of the sample before and after heating. A 75 ton Newbury molding machine is used. The molding conditions are:

| Barrel Temperature | 250° C. |
|---|---|
| Mold Temperature | 180° C. |
| Screw Speed | 150 rpm |
| Pressure | 1000 psi |

The results of several tests ae shown in Table 1.

TABLE 1

Relationship Between the Shrinkage and UL-94 for Different Polytetrafluoroethylenes (PTFE)

| Run | PTFE* | Shrinkage | UL-94 at 1/16" |
|---|---|---|---|
| 1 | 8 | 1 | Fail |
| 2 | DXL-6000 | 1 | Fail |
| 3 | 6C | 25 | V-0 |
| 4 | 60 | 25 | V-0 |
| 7 | 64 | 15 | V-0 |
| 8 | 6CN | 24 | V-0 |
| 9 | 65 | 22 | V-0 |
| 10 | 67 | 22 | V-0 |

*Various grades of Teflon ™ from DuPont

Table 1 shows that only high elastic memory PTFE is effective as an ignition resistant (IR) additive. The high elastic memory PTFE helps the polycarbonate sample contract upon exposure to a flame source and thus imparts ignition resistance to the polycarbonate. The relationship between the % shrinkage and the UL-94 test is also shown in Table 1. The PTFE that gives a polycarbonate shrinkage greater than 15% is effective as an IR additive. Some examples of PTFE that have high elastic memory such as Teflon ™ 6C, 60, 64, CN, 65, and 67 are shown in Table 1. The PTFE that have a low percent of shrinkage such as Teflon ™ DXL-6000 and Teflon ™ 8 did not impart ignition resistance to the polycarbonate.

Suitable fluorine containing polymers are those adapted to form a fibril structure to stabilize the polymer under molten conditions. Such polymers are known to include polytetrafluoroethylene, as disclosed by U.S. Pat. Nos. 3,005,795, 3,671,487 and 4,463,130. The teachings of these patents are incorporated herein by reference.

The acrylic polymers suitable for this invention are well known and have a repeating unit according to the following formula:

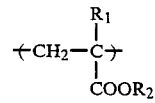

wherein
$R_1$ is hydrogen, alkyl, or phenyl substituted
$R_2$ is alkyl, or phenyl substituted The polyacetal polymers suitable for this invention have a repeating unit according to the following formula:

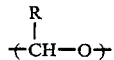

wherein
R is hydrogen or alkyl groups of 1 to 6 carbons

The ABS copolymers are well known and many suitable types are commercially available. Either an acrylonitrile-butadiene-styrene or an acrylonitrile-butadiene-alpha-methyl styrene may be used as the ABS component. Nuclear-substituted styrenes, for example p-methylstyrene can also be used. Particular preferred weight ratios in the ABS copolymer are 2-40% of acrylonitrile, 2-35% of butadiene, and 30-80% styrene.

The copolymer can be prepared by free radical polymerization, in particular by emulsion, suspension, solution or bulk polymerization. Useful methods for preparing these copolymers may be found in U.S. Pat. Nos. 2,505,349; 2,550,139; 2,698,313; 2,713,566; 2,820,773; and 2,908,661.

Useful inorganic acid metal salts for this invention are metal bisulfates or sulfates. Examples of useful metal sulfates are sodium sulfate, potassium sulfate, lithium sulfate, rubidum sulfate, cesium sulfate, and aluminum sulfate. The corresponding metal bisulfates are also useful.

The phosphorus compounds which are suitable according to the invention have the formula below.

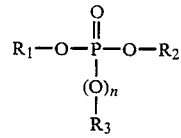

wherein
$R_1$, $R_2$ and $R_3$ are alkyl groups of 1-8 carbons, or alkyl-substituted aryl groups of 7-20 carbons and "n" represents 0 or 1.

Phosphorous compounds which are suitable according to the invention are, for example, triphenyl phosphate, tricresylphosphate, diphenyl 2-ethylcresyl phosphate, tri-(iso-propylphenyl)phosphate, diphenyl methyl phosphate and diethyl phenyl phosphate.

The carbonate polymer compositions of the present invention are suitably prepared by combining the ingredients in effective amounts using any of a variety of blending procedures conventionally employed for polymer blends. For example, dry pellets of the carbonate polymer, and the other additives can be dry blended and the resulting dry blend extruded into the desired shape. By "effective amount" is meant the relative amount of the respective components that is sufficient to provide the desired polymer characteristic.

The amount of the fibril forming polytetrafluoroethylene is preferably in the range from about 0.001 to about 20 percent and preferably in the range from about 0.1 to about 5 percent by weight based on total composition weight.

In addition, other additives can be included in the modified carbonate polymer composition of the present invention such as fillers (i.e., glass fibers), pigments, dyes, antioxidants, heat stabilizers, ultraviolet light absorbers, mold release agents, impact modifiers and other additives commonly employed in carbonate polymer compositions.

The following examples are given to further illustrate the invention and should not be construed as limiting its scope. In the following examples, all parts and percentages are by weight unless otherwise indicated.

EXAMPLE 1

Ignition resistant polyethylene terephthalate (PET) is prepared by adding 0.5 weight % polytetrafluoroethylene (Teflon TM 6C from Du Pont), 0.3% sodium sulfate ($Na_2SO_4$) and 5% triphenylphosphate (TPP) to 94.2% PET base resin having an inherent viscosity of 0.59. The weighed sample is dry blended on a Lightnin blender for 1 minute with constant agitation. The resultant blended material is starve fed to a 30 mm twin screw extruder at 230° C. barrel temperature. The extruded pellets are dried in an oven at 100° C. for 3 hours and molded into bars for flammability measurements.

CONTROL 1

The procedure for example is repeated using no additives (Teflon TM 6C, $Na_2SO_4$, and TPP).

EXAMPLE 2

The procedure for Example 1 is repeated using the same ingredients shown above except that 50% PET and 50% polycarbonate (PC) blend is used.

CONTROL 2

The procedure for Example 1 is repeated using no additives and 50% PET and 50% PC blend.

CONTROLS 3-7

The procedure of Example 1 is repeated using a 50% PET and 50% PC blend. The various additive compositions are described in Table 3.

EXAMPLE 3

The procedure for Example 1 is repeated using 56.5 weight % of PC, 37.7 weight % of PET, 5 weight % of TPP, 0.5 weight % of PTFE and 0.3 weight % of $Na_2SO_4$.

CONTROL 8

The procedure for Example 1 is repeated using 60% PC and 40% PET and no additives.

EXAMPLE 4

The procedure for Example 1 is repeated using a blend of PC and polymethylmethacrylate. The composition of the blend and additives is described in Table 4.

CONTROL 9

The procedure for Example 1 is repeated using 75% PC and 25% polymethylmethacrylate, and no additives.

EXAMPLE 5

The procedure for Example 1 is repeated using PC and polyacetal. The composition of the blend and additives is described in Table 4.

CONTROL 10

The procedure for Example 1 is repeated using 75% PC, 25% polyacetal and no additives.

EXAMPLE 6

The procedure for Example 1 is repeated using PC and styrene-butadiene-acrylonitrile copolymer. The composition of the blend and additives is described in Table 4.

CONTROL 11

The procedure for Example 1 is repeated using 75% PC and 25% styrene-butadiene-acrylonitrile copolymer, and no additives.

EXAMPLE 7

The procedure for Example 1 is repeated using PC. The composition is described in Table 4. The extrusion and mold temperature is 250° C.

CONTROL 12

The procedure for Example 7 is repeated using no additives.

EXAMPLE 8

The procedure for Example 1 is repeated using aromatic polyester carbonate. The extrusion and mold temperature is 310° C.

CONTROL 13

The procedure for Example 8 is repeated using no additives.

TABLE 2

| Sample | UL-94 Test (1/16″) | | |
|---|---|---|---|
| | Avg time (sec) | Number of Drips | Rating |
| Cntrl 1 PET base resin | 100 | 5/5* | HB |
| Cntrl 2 50% PET/50% PC | 100 | 5/5* | HB |
| Ex. 1 Cntrl 1 + 0.5% PTFE 0.3% $Na_2SO_4$ 5.0% TPP | 0.8 | 0 | V-0 |

PC = polycarbonate
PET = polyethylene terephthalate
TPP = triphenylphosphate
PTFE = Teflon TM 6C
*5 bars out of 5 dripped with flame.

TABLE 3

Effects of the Additive on Ignition Resistance of PC/PET Blend

| Sample | | UL-94 Test (1/16") |
|---|---|---|
| Cntrl 3 | Cntrl 2 + 0.5% PTFE | HB |
| Cntrl 4 | Cntrl 2 + 5.0% TPP | HB |
| Cntrl 5 | Cntrl 2 + 5.0% TPP + 0.5% PTFE | HB |
| Cntrl 6 | Cntrl 2 + 0.5% Na$_2$SO$_4$ + 5.0% TPP | HB |
| Cntrl 7 | Cntrl 2 + 0.5 Na$_2$SO$_4$ + 0.5% PTFE | HB |
| Ex. 2 | Cntrl 2 + 0.5% PTFE + 0.3% Na$_2$SO$_4$ + 5.0% TPP | V-0 |

PTFE = Teflon TM 6C
TPP = triphenylphosphate

This table shows that the synergism of the three components, Teflon TM 6C, Na$_2$SO$_4$, and TPP renders the blend ignition resistance.

TABLE 4

| Sample | PC (%) | Second Polymer (%) | TPP (%) | PTFE (%) | (%) Na$_2$SO$_4$ | LOI | UL 94 |
|---|---|---|---|---|---|---|---|
| Cntrl 8 | 60 | 40 PET | 0 | 0 | 0 | 25 | HB |
| Ex. 3 | 56.5 | 37.7 PET | 5 | 0.5 | 0.3 | 28 | V-0 (1/16") |
| Cntrl 9 | 75 | 25 PMMA | 0 | 0 | 0 | 24 | HB |
| Ex. 4 | 66.7 | 22.3 PMMA | 10 | 0.7 | 0.3 | 26.8 | V-0 (1/16") |
| Cntrl 10 | 75 | 25 PA | 0 | 0 | 0 | 21.5 | HB |
| Ex. 5 | 66.7 | 22.3 PA | 10 | 0.7 | 0.3 | 26 | V-0 (1/8") |
| Cntrl 11 | 75 | 25 ABS | 0 | 0 | 0 | 24 | HB |
| Ex. 6 | 66.7 | 22.3 ABS | 10 | 0.7 | 0.3 | 26.5 | V-0 (1/16") |
| Cntrl 12 | 100 | 0 | 0 | 0 | 0 | 27 | V$_2$ |
| Ex. 7 | 98.2 | 0 | 1 | 0.5 | 0.3 | NA | V-0 (1/16") |
| Cntrl 13 | 100 AEC | 0 | 0 | 0 | 0 | NA | V$_2$ |
| Ex. 8 | 94.2 AEC | 0 | 5 | 0.5 | 0.3 | NA | V-0 (1/16") |

AEC = aromatic polyester carbonate
PC = polycarbonate
PET = polyethylene terephthalate
PMMA = polymethylmethacrylate
PA = polyacetal
ABS = acrylonitrile-butadiene-styrene copolymer
TPP = triphenylphosphate
PTFE = Teflon TM 6C
LOI = Limiting oxygen index (ASTM D-2863-70)

Table 4 shows that ignition resistant (IR) combination of this invention works for a wide variety of thermoplastics such as polycarbonate, aromatic polyester carbonate, polyesters, polycarbonate-polyester blend, polycarbonate-ABS blend, polycarbonate-polyacetal blend, and polycarbonate-polymethylmethacrylate blend.

We claim:

1. An ignition resistant non-haloaromatic thermoplastic composition consisting essentially of
   (A) a member of the group consisting of
   (i) a non-carbonate thermoplastic polymer,
   (ii) a carbonate polymer, and
   (iii) a blend of A and B,
   (B) 0.001 to 20% by weight of a high elastic memory polytetrafluoroethylene having a heat shrinkage equal to or greater than 15%,
   (C) 0.1 to 30% by weight of an organic phosphate, and
   (D) 0.001 to 10% by weight of a metal salt of an inorganic acid.

2. An ignition resistant non-haloaromatic thermoplastic composition consisting essentially of
   (A) a non-carbonate thermoplastic polymer,
   (B) 0.001 to 20% by weight of a high elastic memory polytetrafluoroethylene having a heat shrinkage equal to or greater than 15%,
   (C) 0.1 to 30% by weight of an organic phosphate, and
   (D) 0.001 to 10% by weight of a metal salt of an inorganic acid.

3. An ignition resistant non-haloaromatic thermoplastic composition consisting essentially of
   (A) a carbonate polymer,
   (B) 0.001 to 20% by weight of a high elastic memory polytetrafluoroethylene having a heat shrinkage equal to or greater than 15%,
   (C) 0.1 to 30% by weight of an organic phosphate, and
   (D) 0.001 to 10% by weight of a metal salt of an inorganic acid.

4. An ignition resistant non-haloaromatic thermoplastic composition consisting essentially of
   (A) a blend of a non-carbonate thermoplastic polymer and a carbonate polymer,
   (B) 0.001 to 20% by weight of a high elastic memory polytetrafluoroethylene having a heat shrinkage equal to or greater than 15%,
   (C) 0.1 to 30% by weight of an organic phosphate, and
   (D) 0.001 to 10% by weight of a metal salt of an inorganic acid.

5. An ignition resistant thermoplastic composition consisting essentially of
   (A) a thermoplastic polymer selected from the group consisting of polyester terephthalates, polyacetals, polymethylmethacrylates, and acrylonitrile-butadiene-styrene copolymers,
   (B) 0 to 99% by weight of a carbonate polymer,
   (C) 0.001 to 20% by weight of a high elastic memory polytetrafluoroethylene having a heat shrinkage equal to or greater than 15%,
   (D) 0.1 to 30% by weight of an organic phosphate, and
   (E) 0.001 to 10% by weight of an alkali metal sulfate.

6. An ignition resistant polycarbonate resin blend with thermoplastic polymers consisting essentially of
   (A) 5 to 95% by weight of one or more non-carbonate thermoplastic polymers,
   (B) 0.001 to 20% by weight fibril forming polytetrafluoroethylene,
   (C) 0.1 to 30% by weight organic phosphates, and
   (D) 0.001 to 10% by weight alkali metal sulfate.

7. The ignition resistant polycarbonate resin blend of claim 6 wherein the thermoplastic polymer is polyethylene terephthalate.

8. The ignition resistant polycarbonate resin blend of claim 6 wherein the thermoplastic polymer is polymethylmethacrylate.

9. The ignition resistant polycarbonate resin blend of claim 6 wherein the thermoplastic polymer is polyacetal.

10. The ignition resistant polycarbonate resin blend of claim 6 wherein the thermoplastic polymer is styrene-butadiene-acrylonitrile copolymer.

11. In an ignition resistant non-haloaromatic thermoplastic composition consisting essentially of (A) a non-carbonate thermoplastic polymer,
(B) a carbonate polymer,
(C) 0.001 to 20% by weight of a high elastic memory polytetrafluoroethylene having a heat shrinkage equal to or greater than 15%, and
(D) 0.1 to 30% by weight of an organic phosphate, the improvement which comprises adding 0.001 to 10% by weight of an alkali metal sulfate to said composition.

* * * * *